United States Patent [19]
Shirota et al.

[11] Patent Number: 5,427,611
[45] Date of Patent: Jun. 27, 1995

[54] NORMALLY SOLID RECORDING MATERIAL AND JET RECORDING METHOD USING SAME

[75] Inventors: Katsuhiro Shirota, Inagi; Yoshihisa Takizawa, Kawasaki, both of Japan

[73] Assignee: Canon Kabushiki Kaisha, Tokyo, Japan

[21] Appl. No.: 322,392

[22] Filed: Oct. 12, 1994

Related U.S. Application Data

[63] Continuation of Ser. No. 925,269, Aug. 6, 1992, abandoned.

[30] Foreign Application Priority Data

Aug. 12, 1991 [JP] Japan .................. 3-225362

[51] Int. Cl.$^6$ .............................................. C09D 11/02
[52] U.S. Cl. .................. 106/22 A; 106/22 H; 106/22 D; 106/22 K
[58] Field of Search .......... 106/22 A, 22 H, 22 D, 106/22 K

[56] References Cited

U.S. PATENT DOCUMENTS

| | | | |
|---|---|---|---|
| 4,804,411 | 2/1989 | Eida et al. | 106/22 K |
| 4,820,346 | 4/1989 | Nowak | 106/22 A |
| 4,878,946 | 11/1989 | Tabayashi et al. | 106/22 A |
| 5,000,786 | 3/1991 | Matsuzaki | 106/22 A |
| 5,006,170 | 4/1991 | Schwarz et al. | 106/20 R |
| 5,055,566 | 10/1991 | Gregory et al. | 106/22 K |
| 5,084,099 | 1/1992 | Jaeger et al. | 106/22 H |
| 5,102,448 | 4/1992 | Parton et al. | 106/22 A |
| 5,110,356 | 5/1992 | Shirota et al. | 106/22 K |
| 5,118,351 | 6/1992 | Shirota et al. | 106/22 R |
| 5,135,570 | 8/1992 | Eida et al. | 106/22 K |
| 5,135,571 | 8/1992 | Shirota et al. | 106/22 K |
| 5,137,570 | 8/1992 | Nishiwaki et al. | 106/22 K |
| 5,139,573 | 8/1992 | Yamamoto et al. | 106/22 K |
| 5,141,559 | 8/1992 | Shinozuka et al. | 106/22 A |

FOREIGN PATENT DOCUMENTS

| | | |
|---|---|---|
| 55-54368A | 4/1980 | Japan . |
| 58-108271A | 6/1983 | Japan . |
| 61-83268A | 4/1986 | Japan . |
| 61-159470A | 7/1986 | Japan . |
| 62-48774A | 3/1987 | Japan . |

*Primary Examiner*—Helene Klemanski
*Attorney, Agent, or Firm*—Fitzpatrick, Cella, Harper & Scinto

[57] ABSTRACT

A normally solid recording material for use in a jet recording method wherein a recording material is ejected through an ejection outlet for recording, is composed from a heat-fusible solid vehicle and a dye compound. The dye compound is formed as a salt of a dye having a group of —$SO_3M$ or —COOM (wherein M denotes an alkali metal) and a linear alkylamine. As a result, the dye compound is provided with an increased molecular length, because of which the sublimability of the dye compound is suppressed to provide the recording material with improved fixability and freeness from a bleeding phenomenon that the color of a recorded image is transferred to another sheet contacting the image.

12 Claims, 6 Drawing Sheets

NORMALLY SOLID RECORDING MATERIAL AND JET RECORDING METHOD USING SAME

This application is a continuation of application Ser. No. 07/925,269 filed Aug. 6 1992, which is now abandoned.

FIELD OF THE INVENTION AND RELATED ART

The present invention relates to a normally solid recording material (i.e., a recording material or ink which is solid at room temperature (but can be liquid at an elevated temperature)), particularly a normally solid recording material used in a jet recording method, and a jet recording method using the recording material.

In the jet recording method, droplets of a recording material (ink) are ejected to be attached to a recording medium such as paper for accomplishing recording. In the method disclosed in U.S. Pat. Nos. 4,410,899, 4,723,129 and 4,723,129 assigned to the present assignee among the known jet recording methods, a normally liquid ink is used, a bubble is generated in the ink by applying a heat energy to the ink, and an ink droplet is ejected through an ejection outlet (orifice), whereby a recording head provided with high-density multi-orifices can be easily realized to record a high-quality image having a high resolution at a high speed.

The inks used in the jet recording method are required to satisfy contradictory properties such that they are quickly dried and fixed on the recording medium but they do not readily plug a nozzle due to drying in the nozzle.

In order to comply with the requirements, the conventional normally liquid inks generally comprise water as a principal constituent, and also contain a water-soluble high-boiling solvent, such as a glycol, for the purposes of preventing drying and plugging, etc. When such inks are used for recording on plain paper, there are encountered several problems such that the inks are not quickly dried and fixed and the ink image immediately after the printing is liable to rub off on hands upon on touching and smeared, lowering the printing quality.

Further, the ink penetrability remarkably varies depending on the kind of recording paper, so that only special paper is usable when such conventional aqueous inks are used. In recent years, however, it is required to perform good recording on so-called plain paper, inclusive of copy paper, report paper, note book paper and letter paper.

In order to solve the above problems, there have been disclosed jet recording methods wherein a normally solid hot melt-type ink is heat-melted to be ejected, as in U.S. Pat. No. 5,006,170, JP-A 108271/1983, JP-A 83268/1986, JP-A 159470/1986, JP-A 48774/1987 and JP-A 54368/1980.

By using a normally solid hot melt-type ink, it is possible to solve the problems regarding the blurring and fixation of images, but there has been frequently encountered another problem of a so-called bleeding phenomenon such that, when an image on recording paper is caused to contact another paper or resin sheet for a long period, the colorant in the image is sublimated to color the paper or resin sheet. The bleeding phenomenon is liable to occur in the case where an oil-soluble dye is used as a colorant in the recording material and a relief image is formed on a recording paper.

The bleeding phenomenon can be obviated if a pigment less liable to cause bleeding is selected as a colorant in the recording material, but such a pigment has little affinity with a solid vehicle in the recording material, so that a special technique for dispersion stabilization, which has not been fully established, is required. Particularly, in the case where a recording material containing such a pigment is used in a jet recording method comprising a repetitive cycle of heating for melting and cooling for solidification, the recording material is liable to plug an ejecting nozzle.

SUMMARY OF THE INVENTION

An object of the present invention is to provide a normally solid recording material having excellent reliability, i.e., free from bleeding of a colorant, having a good storage stability for a long period and free from plugging, and a jet recording method using the recording material.

According to the present invention, there is provided a normally solid recording material for use in a jet recording method wherein a recording material is ejected through an ejection outlet for recording, said normally solid recording material comprising a heat-fusible solid vehicle and a dye compound which is a salt of a dye having a group of $-SO_3M$ or $-COOM$, wherein M denotes an alkali metal, and a linear alkylamine.

According to another aspect of the present invention, there is provided a jet recording method, comprising:
heat-melting the above-mentioned recording material, and
imparting to the recording material a thermal energy corresponding to a recording signal to generate a bubble in the recording material, thus ejecting a droplet of the recording material out of the ejection outlet under action of the bubble.

According to another aspect of the present invention, there is provided a jet recording method, comprising:
heat-melting the above-mentioned recording material, and
ejecting a droplet of the melted recording material through an ejection outlet under action of a piezoelectric vibrating element deformed corresponding to a recording signal.

These and other objects, features and advantages of the present invention will become more apparent upon a consideration of the following description of the preferred embodiments of the present invention taken in conjunction with the accompanying drawings.

DETAILED DESCRIPTION OF THE INVENTION

In the recording method according to the present invention, a normally solid recording material (ink, i.e., a recording material which is solid at room temperature (5° C.–35° C.)) is melted under heating, and the melted recording material is supplied with a heat energy or piezoelectric deformation energy corresponding to given recording data to be ejected through an ejection outlet (orifice) for recording.

The normally solid recording material according to the present invention comprises a specific dye compound in a heat-fusible solid vehicle. The recording material may further contain an optional additive for modifying the physical properties or a normally liquid organic solvent, as desired.

The recording material according to the present invention should preferably have a melting point in the range of 36° C.–200° C. Below 36° C., the recording material is liable to be melted, soiling hands, etc. due to a change in room temperature. Above 200° C., a large energy is required for melting the recording material. More preferably, the melting point should be in the range of 36°–150° C.

As a result of our study regarding the bleeding phenomenon, an ordinary oil-soluble dye has little interaction between molecules because of low polarity, so that the dye per se is liable to be sublimated. This phenomenon is particularly noticeable for oil-soluble dyes of yellow and magenta, etc., having a relatively short molecular length. Based on this knowledge, it has been also confirmed that a dye compound formed as a salt of a dye having a group of —$SO_3M$ or —COOM (M=an alkali metal) and a linear alkylamine is provided with an increased molecular length compared with an ordinary oil-soluble dye and with a suppressed sublimability accordingly. Further, the resultant dye compound is also provided with a good affinity with a heat-fusible solid vehicle owing to inclusion of the linear alkylamine.

Accordingly, it has been found that the recording material according to the present invention containing the dye compound is free from the bleeding phenomenon, i.e., a color transfer phenomenon, even when it is caused to contact paper or a resinous sheet of, e.g., polyvinyl chloride, polypropylene, or polyethylene. Further, the recording material according to the present invention containing the dye compound is also found to be excellent with respect to light-fastness and moisture resistance.

The dye compound used in the recording material according to the present invention may be produced from an ordinary water-soluble dye having a group of —$SO_3M$ or —COOM (M=an alkali metal such as Na) and by reacting the dye with a linear alkylamine.

More specifically, in order to obtain a dye compound used in the recording material according to the present invention, such a starting dye having a group of —$SO_3M$ or —COOM may be dissolved in water, and then an appropriate mineral acid may be added thereto to convert the dye from the alkali metal salt form into a free acid form, which has a lower solubility in water and is precipitated. Then, the precipitate of the dye may be dispersed in an appropriate solvent, such as alcohol, and a linear alkylamine may be added thereto to form an objective dye compound in the form of a salt dissolved in the solvent.

The above series of reactions may be represented by the following reaction scheme wherein the starting dye is represented by D-$SO_3M$, and the linear alkylamine is represented by R-$NH_2$:

The starting dye may be any dye having an acidic group in the form of an alkali metal salt. Examples thereof may be found in the Color Index, and some specific examples thereof are enumerated hereinbelow:

C.I. Direct Black 17, 19, 32, 51, 71, 154, 168;
C.I. Direct Blue 6, 22, 25, 71, 86, 90, 106, 199;
C.I. Direct Red 1, 4, 17, 28, 83;
C.I. Direct Yellow 12, 24, 26, 86, 98;
C.I. Direct Orange 34, 39, 44, 46, 60;
C. I. Direct Brown 109;
C.I. Direct Green 59;
C.I. Acid Black 2, 7, 24, 26, 31, 52, 63, 112, 118;
C.I. Acid Blue 9, 22, 40, 59, 93, 102, 104, 113, 117, 120, 167, 229, 134;
C.I. Acid Red 1, 6, 32, 35, 37, 51, 52, 80, 85, 87, 92, 94, 115, 180, 256, 317, 315;
C.I. Acid Yellow 11, 17, 23, 25, 29, 42, 61, 71;
C.I. Acid Orange 7, 19;
C.I. Acid Violet 49;
C.I. Food Black 1, 2;
C.I. Reactive Red 23.

The above-enumerated dyes are particularly preferred examples of the starting dye used in the present invention, but the starting dye is not restricted to the above examples.

Particularly preferred examples of the linear alkylamine to be reacted with the above-mentioned starting dye may include; methylamine, ethylamine, propylamine, butylamine, pentylamine, hexylamine, octylamine, decylamine, laurylamine, cetylamine, and stearylamine.

The property of the resultant dye compound mainly depends on the number of carbon atoms contained in the linear alkylamine forming the salt with the starting dye. If the alkylamine has a larger number of carbon atoms, the dye compound after the salt formation is provided with a larger molecular length and the sublimability thereof is effectively suppressed, whereby the bleeding phenomenon is effectively suppressed. There is further observed a tendency that a salt-forming alkylamine having a longer carbon chain provides a dye compound having a larger mutual solubility with the heat-fusible solid vehicle. Accordingly, by selecting an alkylamine used, it is possible to realize optimum conditions while taking the sublimability and mutual solubility with the heat-fusible solid vehicle of the dye compound.

The linear alkylamine may preferably contain 6–30 carbon atoms, further preferably 8–22 carbon atoms.

The recording material according to the present invention may contain the dye compound at an appropriate concentration as desired but desirably at a concentration of 0.1-15 wt. %, preferably 0.5-10 wt. %, more preferably 1-8 wt. %.

The heat-fusible solid vehicle as a principal constituent of the recording material according to the present invention may comprise a solid organic compound having a melting point above room temperature and particularly preferably may comprise an organic compound having an alkyl chain, such as fatty acids and derivatives thereof, monohydric or dihydric alcohols, and ketones in view of good compatibility (mutual solubility) with the dye compound for effective suppression of the above-mentioned bleeding phenomenon.

More specific examples of the compound constituting the heat-fusible solid vehicle may include: higher fatty acids, such as lauric acid, and behenic acid; fatty acid amides, such as laurylamide and stearylamide; fatty acid esters, such as n-butyl p-hydroxybenzoate, methyl nitrobenzoate, and phenyl benzoate; mono- or di-hydric alcohols, such as 1-tetradecanol, 1-hexadecanol, 1-stearyl-alcohol, cyclododecanol, 1,6-hexanediol, 1,10-decanediol, and 1,12-dodecanediol; and ketones, such as diundecyl ketone, diheptadecyl ketone, and cyclododecanone. These compounds may be used singly or in mixture of two or more species to constitute the heat-fusible solid vehicle.

The above compounds have some varying properties, inclusive of those having particularly excellent ejection characteristic, those having particularly excellent storage stability, and those causing extremely little blurring on a recording medium, such as paper. Accordingly, appropriate selection made be made to constitute a heat-fusible solid vehicle desired depending on the usage.

A normally solid recording material providing a recorded image with excellent fixability and capable of converting a supplied thermal energy to a discharge energy, may be obtained if the heat-fusible solid vehicle has a melting point Tm and a boiling point Tb (at 1 atm. herein) satisfying the following conditions (A) and (B) in combination.

$$36° C. \leq Tm \leq 150° C. \qquad (A)$$

$$150° C. \leq Tb \leq 370° C. \qquad (B)$$

The boiling point Tb may preferably satisfy $200° C. \leq Tb \leq 340° C.$

The heat-fusible solid vehicle may desirably be contained in a proportion of 50-99 wt. %, preferably 60-99 wt. %, of the recording material according to the present invention. Below 50 wt. %, a long time is required for phase change from the melted state (liquid) to the solid state, thus resulting in blurring of images or blocking. Heat-fusible substance satisfying the above conditions (A) and (B) in combination may preferably be contained in a proportion of 30-99 wt. % of the recording material.

Further, within an extent that the resultant recording material retains a solid state at a normal temperature (5°-35° C.), it is possible to incorporate a normally liquid organic solvent, such as alcohol. It is further possible to add various additives, such as an antioxidant, dispersing acid, super-cooling agent and anti-corrosion agent, as desired within an extent not adversely affecting the object of the present invention.

Figure 1:
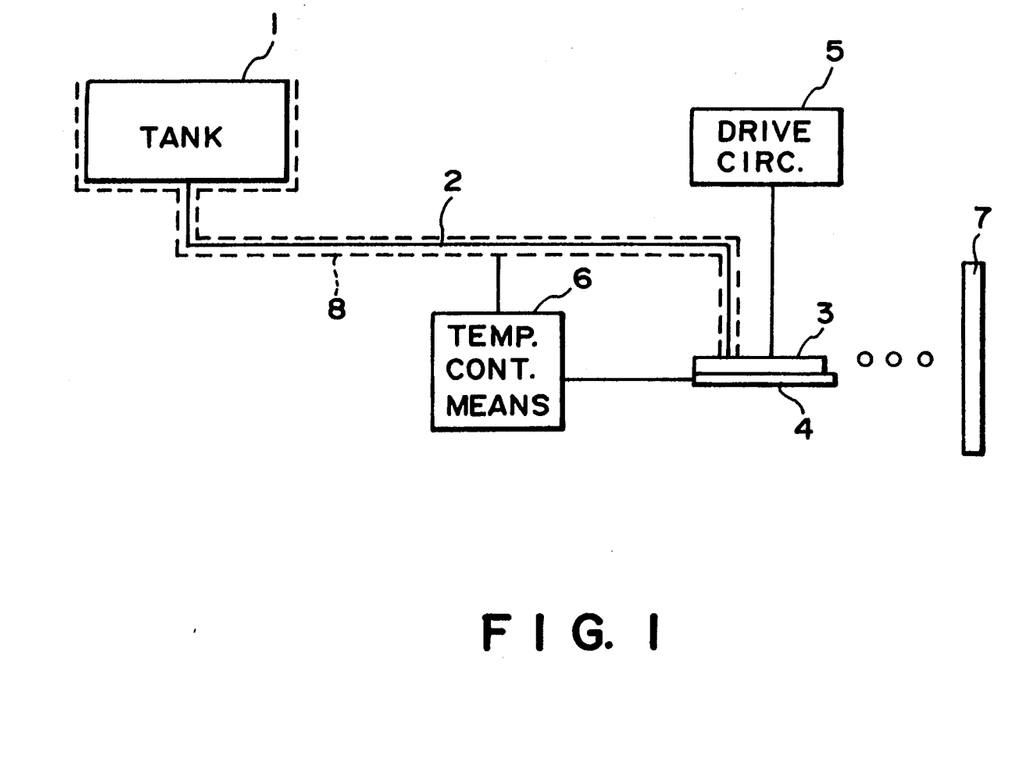
FIG. 1 is a schematic illustration of an embodiment of a recording apparatus using a recording material according to the invention.

Now, the jet recording method using the normally solid recording material according to the present invention will be explained. FIG. 1 illustrates an apparatus for practicing the jet recording method according to the present invention, wherein a recording material contained in a tank 1 is supplied through a passage 2 to a recording head 3. The recording head 3 may, for example, be one illustrated in FIGS. 2A and 2B. The tank 1, passage 2 and recording head 3 are supplied with heat by heating means 8 and 4 to keep the recording material in a liquid state in the apparatus. The heating means 8 and 4 are set to a prescribed temperature by a temperature control means 6. The recording head 3 is supplied with a recording signal from a drive circuit 5 to drive an ejection energy-generating means (e.g., a heater) in the recording head corresponding to the recording signal.

Figure 2A:
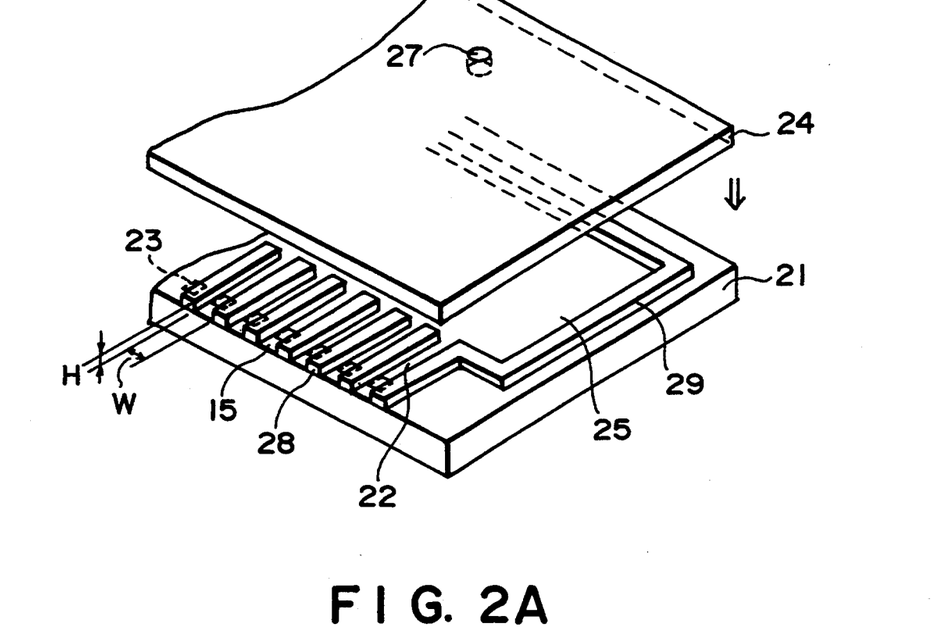
FIGS. 2A and 2B are a schematic partial perspective view and a schematic plan view of a recording head used in the recording apparatus shown in FIG. 1.
Figure 2B:
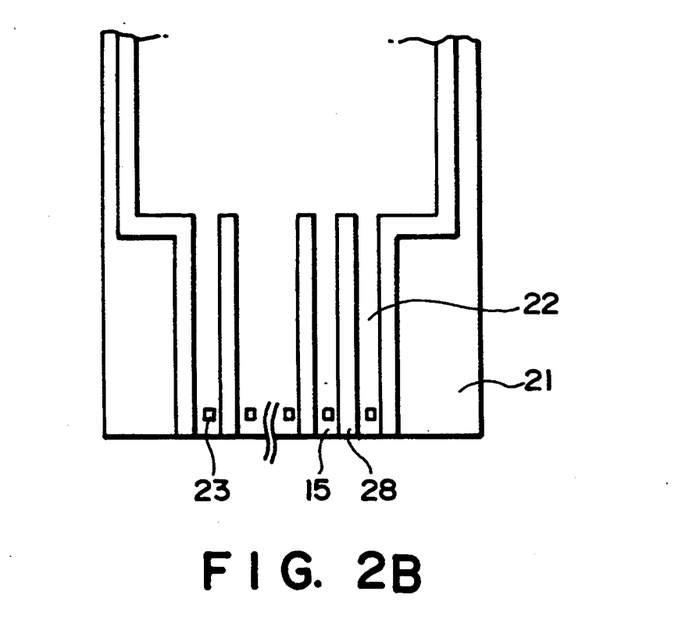

As shown in FIGS. 2A and 2B, the recording head 3 is provided with a plurality of walls 28 disposed in parallel with each other on a substrate 1 and a wall 29 defining a liquid chamber 25. On the walls 28 and 29, a transparent ceiling plate 24 is disposed. In FIG. 2A, the ceiling plate 24 is shown apart from the walls 28 and 29 for convenience of showing an inside structure of the recording head. The ceiling plate 24 is equipped with an ink supply port 27, through which a melted recording material is supplied into the liquid chamber 25. Between each pair of adjacent walls 28, a nozzle 22 is formed for passing the melted recording material. At an intermediate part of each nozzle 22 on the substrate 21, a heater 23 is disposed for supplying a thermal energy corresponding to a recording signal to the recording material. A bubble is created in the recording material by the thermal energy from the heater 23 to eject the recording material through the ejection outlet 15 of the nozzle 22. In this way, a recorded image is formed on recording paper 7.

In the recording method according to the present invention, it is preferred that, when a bubble is created and expanded by the supply of thermal energy to reach a prescribed volume, the bubble is caused to thrust out of the ejection outlet 15 to communicate with the ambience (atmosphere). By this measure, substantially all the recording material present between the created bubble and the ejection outlet 15 is discharged. Accordingly, the volume of the discharged droplet becomes always constant. In the conventional jet recording method, a bubble created in a recording material does not ordinarily communicate with the ambience but shrinks to disappear after it reaches a maximum volume. In such a conventional cases where a bubble created in the recording material does not communicate with the ambience, all the recording material present between the bubble and the ejection outlet 15 is not discharged but only a part thereof is discharged.

The preferred jet recording method wherein a created bubble is caused to thrust out of the ejection outlet 15 to communicate with the ambience, will now be explained with reference to FIGS. 3A-3D.

Figure 3A:
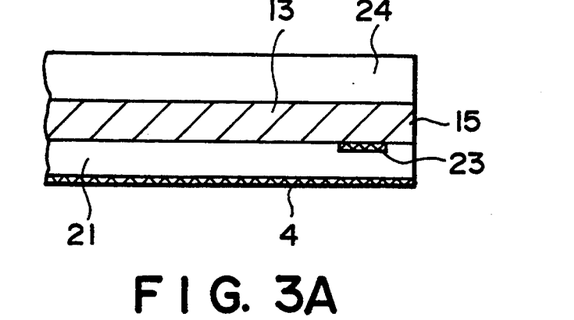
FIGS. 3A–3D are schematic sectional views of a recording head supplying a recording material for illustration of a principle of the recording method according to the invention.
Figure 3B:
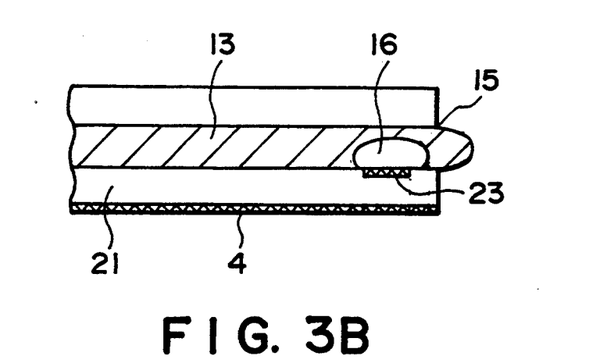
Figure 3C:
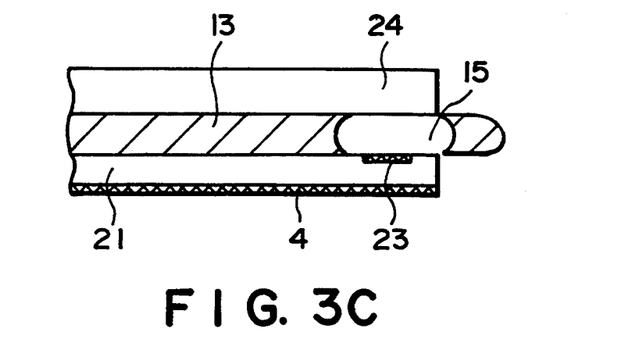
Figure 3D:
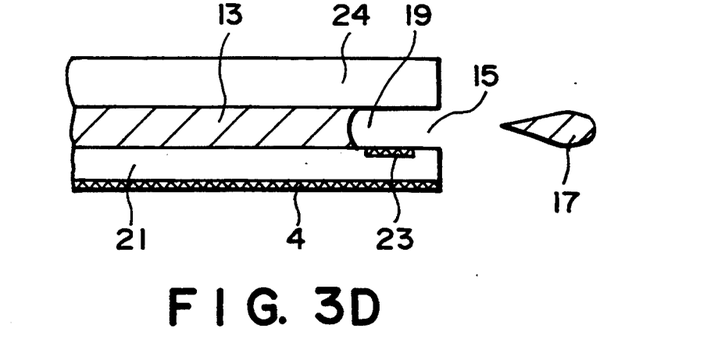

FIGS. 3A-3D show sections of a nozzle 22 formed in the recording head 3, including FIG. 3A showing a state before bubble creation. First, current is supplied to a heating means 4 to keep a normally solid recording material (hereinafter sometimes referred to as "solid ink" or simply "ink") 13 in a molten state. Then, the heater 23 is supplied with a pulse current to instantaneously heat the ink 13 in the vicinity of the heater 23, whereby the ink 13 causes abrupt boiling to vigorously generate a bubble 16, which further begins to expand (FIG. 3B). The bubble 16 further continually expands and grows particularly toward the ejection outlet 15 providing a smaller inertante until it thrusts out of the ejection outlet 15 to communicate with the ambience (FIG. 3C). A portion of the ink 13 which has been closer to the ambience than the bubble 16 is ejected forward due to kinetic momentum which has been imparted thereto by the bubble 16 up to the moment and soon forms a droplet to be deposited onto a recording medium, such as paper (not shown) (FIG. 3D). A cavity left at the tip of the nozzle after the ejection of the ink 13 is filled with a fresh portion of the ink owing to the surface tension of the succeeding portion of the ink and the wetness of the nozzle wall to restore the state before the ejection.

In the recording head 3, the heater 23 is disposed closer to the ejection outlet 15 than in the conventional recording head. This is the simplest structure adaptable for communication of a bubble with the ambience, i.e., bubble-through. The communication of a bubble with the ambience is further accomplished by desirably selecting factors, such as the thermal energy generated by the heater 23, the ink properties and various sizes of the recording head (distance between the ejection outlet 15 and the heater 23, the widths and heights of the outlet 15 and the nozzle 22). The required closeness of the heater 23 to the ejection outlet 15 cannot be simply determined but, as a measure, the distance from the front end of the heater 23 to the ejection outlet (or from the surface of the heater 23 to the ejection outlet 15 in the cases of a recording head as shown in FIGS. 4A–4D described hereinafter) may preferably be 5–80 microns, further preferably 10–60 microns.

In order to ensure the communication of a bubble with the ambience, the nozzle 22 may preferably have a height H which is equal to or smaller than a width. W thereof, respectively at the part provided with the heater 23 (FIG. 2A). In order to ensure the bubble communication with the ambience, the heater 23 may preferably have a width H which is 50–95%, particularly 70–90%, of the width W of the nozzle. Further, it is preferred that the recording material is melted under heating by the heating means 24 to have a viscosity of at most 100 cps.

It is further preferred to design so that a bubble communicates with the ambience when the bubble reaches 70% or more, further preferably 80% or more, of a maximum volume which would be reached when the bubble does not communicate with the ambience.

In the present invention, it is preferred that a bubble created by the heater 23 is caused to communicate with the ambience out of the ejection outlet 15 when the internal pressure of the bubble is not higher than the ambient (atmospheric) pressure.

Figure 5:
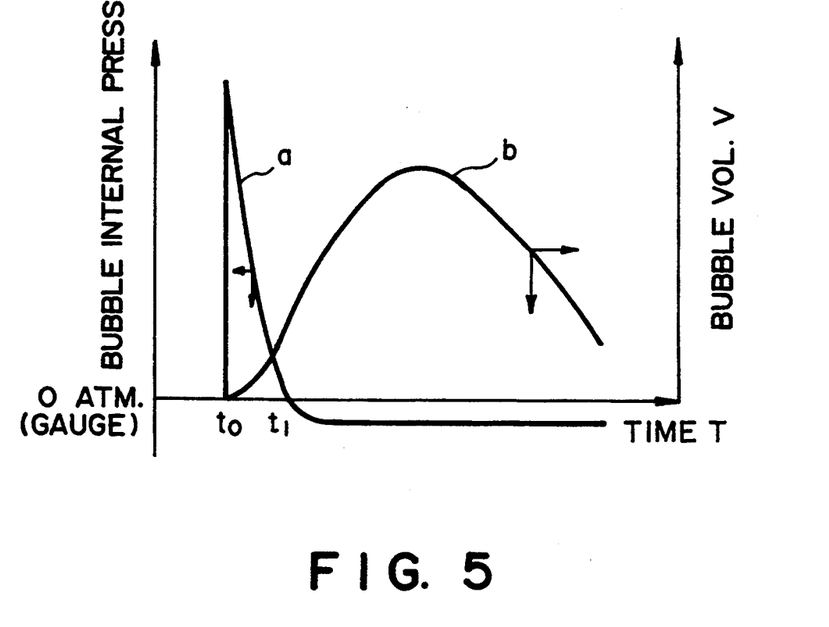
FIG. 5 is a graph showing an example of changes in internal pressure and volume of a bubble in the case of non-communication of the bubble with the ambience (atmosphere).

FIG. 5 is a graph showing a relationship between the internal pressure (curve a) and the volume (curve b), of a bubble in case where the bubble does not communicate with the ambience. Referring to FIG. 5, at time $T=t_0$ when the heater 23 is energized with a pulse current, a bubble is created in the recording material to cause an abrupt increase in bubble internal pressure and the bubble starts to expand simultaneously with the creation.

The bubble expansion does not cease immediately after the termination of current supply to the heater 23 but continues for a while thereafter. As a result, the bubble internal pressure abruptly decreases to reach a pressure below the ambient pressure (0 atm.-gauge) after $T=t_1$. After expansion to some extent, the bubble starts to shrink and disappears.

Figure 6:
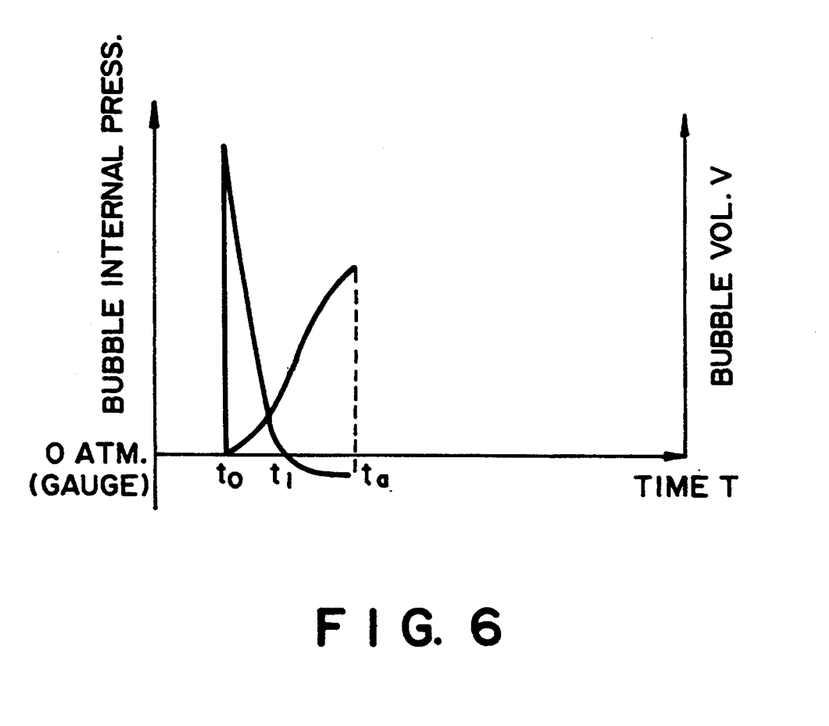
FIG. 6 is a graph showing an example of changes in internal pressure and volume of a bubble in the case of communication of the bubble with the ambience.

Accordingly, if the bubble is caused to communicate with the ambience at some time after time $T=t_1$, e.g., time ta, as shown in FIG. 6, the bubble internal pressure immediately before the communication is lower than the ambient pressure.

If the bubble is communicated with the ambience to eject a droplet when the internal pressure thereof is below the ambient pressure, the formation of splash or mist of the recording material unnecessary for recording can be prevented, so that the soiling of the recording medium or the apparatus is avoided.

Hitherto, in the conventional jet recording method, there has been encountered a problem that splash or mist of the recording material is ejected in addition to a droplet effective for recording. The occurrence of such splash or mist can be prevented by lowering the bubble internal pressure to a value not higher than the ambient pressure when the bubble is communicated with the ambience in the present invention.

It is difficult to directly measure the bubble internal pressure, but the satisfaction of the condition of the bubble internal pressure being smaller than the ambient pressure may be suitably judged in the following manner.

The volume Vb of the bubble is measured from the start of the bubble creation to the communication thereof with the ambience. Then, the second order differential $d^2Vb/dt^2$ is calculated, based on which the relative magnitudes of the internal pressure and the atmospheric pressure may be judged. If $d^2Vb/dt^2>0$, the internal pressure is higher than the ambient pressure. If $d^2Vb/dt^2 \leq 0$, the internal pressure is not higher than the ambient pressure. Referring to FIG. 6, during a period of from the state of bubble creation at time $T=t_0$ to time $T=t_1$, the bubble internal pressure is higher than the ambient pressure ($d^2Vb/dt^2>0$), and during a period from time $T=t_1$ to the bubble communication with the ambience at time $T=ta$, the bubble internal pressure is lower than the ambient pressure. As described above, by calculating $d^2Vb/dt^2$, i.e., the second order differential of Vb, it is possible to know the relationship regarding magnitude between the bubble internal pressure and the ambient pressure.

Figure 4A:
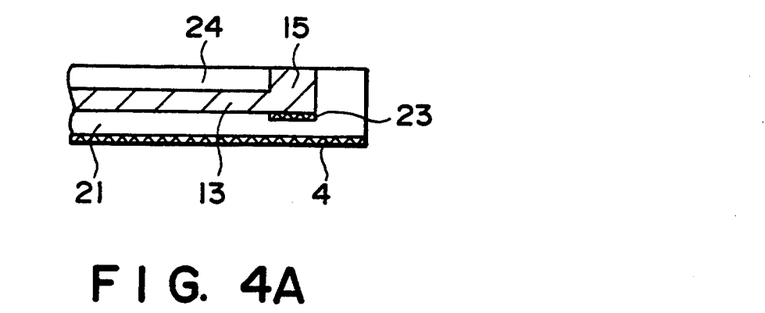
FIGS. 4A–4D are schematic sectional views of another example of a recording head supplying a recording material for illustration of a principle of the recording method according to the invention.
Figure 4B:
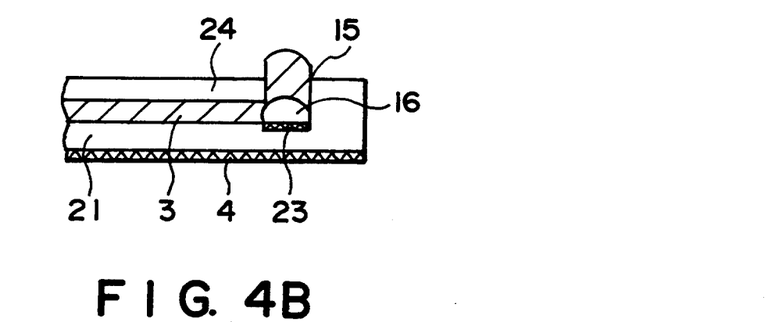
Figure 4C:
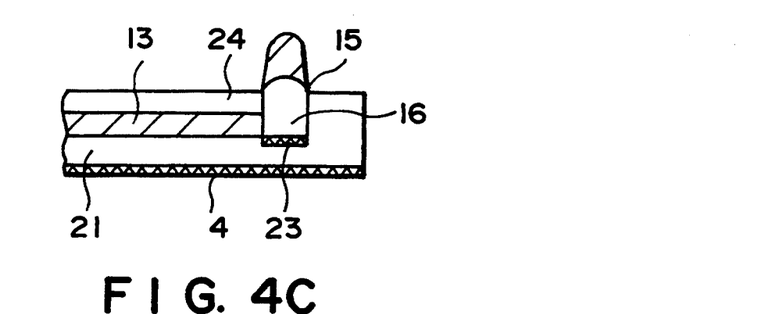
Figure 4D:
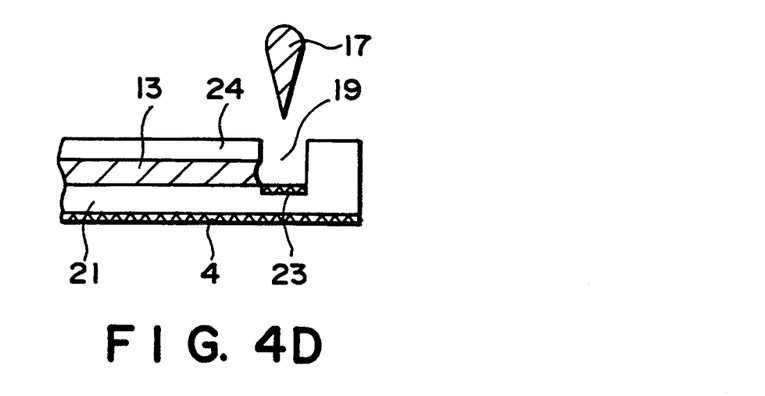

FIGS. 4A–4D illustrate another embodiment of the recording head used in the present invention which includes an ejection outlet 15 disposed on a lateral side of a nozzle 22. Also in the case of using the recording head shown in FIGS. 4A–4D, a bubble 16 is caused to communicate with the ambience similarly as in the case of using the head shown in FIGS. 3A–3D. More specifically, from a state of before bubble generation in FIG. 4A, a recording material 13 melted under operation of a heating means 4 is heated by energizing a heater 23 to create a bubble 16 on the heater 2 (FIG. 4B). The bubble 16 continues to expand (FIG. 4C) until it communicates with the ambience to eject a droplet 17 out of the ejection outlet 15 (FIG. 4D).

Figure 7:
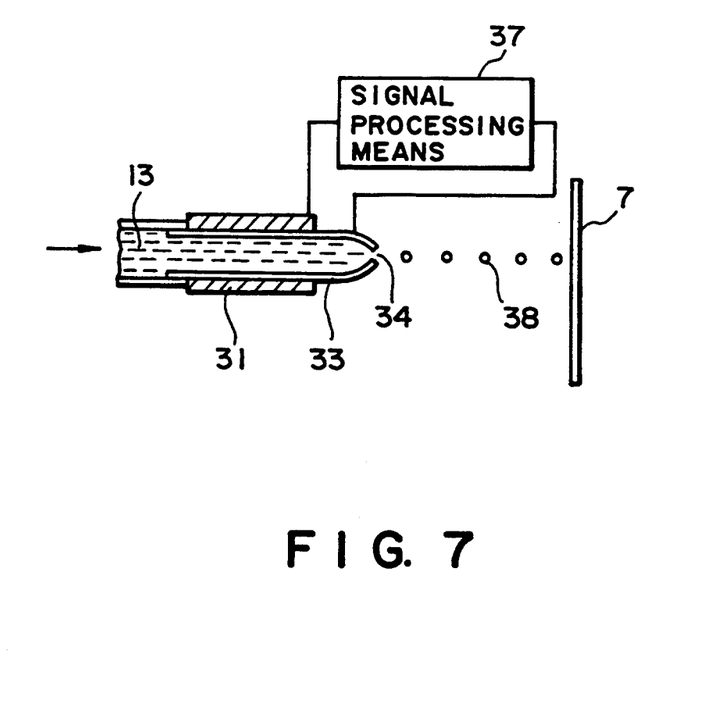
FIG. 7 is an illustrative sectional view of another example: of a recording head used in the recording apparatus shown in FIG. 1.

The recording material according to the present invention can be used not only in the jet recording method as described above wherein a bubble is thermally created in the recording material for recording, but also in a jet recording method as illustrated in FIG. 7 wherein a droplet 38 of a recording material 13 is discharged for recording by utilizing deformation of a piezoelectric vibrator element 31. More specifically, as show in FIG. 7, a nozzle 33 provided with a cylindrical piezoelectric vibrator element 31 on its outer circumference is filled with a recording material 13 which has been placed in a molten state by a heating means (not shown). Then, a voltage corresponding to a recording signal supplied from a signal processing means is applied to the piezoelectric vibrator 31 to cause the circumferential shrinkable thereof to discharge the droplets 38 out of an ejection outlet 34 of the nozzle 33 for recording on recording paper 7.

As described above, according to the recording material and recording method of the present invention, good recorded products can be provided, which are free from the bleeding phenomenon even if they are left in intimate contact with another paper or resin sheet.

Hereinafter, the present invention will be described more specifically based on Examples and Comparative Examples.

Examples 1–7

Recording materials (Examples 1–7) according to the present invention respectively having a composition described below, were each prepared by melting the respective heat-fusible solid substance(s) under heating and mixing therewith the respective dye compound, followed by stirring for 3 hours and filtering for removal of insoluble matter.

(Example 1)

| | |
|---|---|
| C.I. Food Black 2 dodecylamine salt | 5 wt. % |
| Ethylene carbonate (Tm = 39° C.) | 30 wt. % |
| 1,12-Dodecanediol (Tm = 82° C.) | 65 wt. % |

(Tm: melting point)

(Example 2)

| | |
|---|---|
| C.I. Direct Black 168 n-octylamine salt | 4 wt. % |
| Palmitic acid (Tm = 62° C.) | 96 wt. % |

(Example 3)

| | |
|---|---|
| C.I. Acid Red 35 n-stearylamine salt | 6 wt. % |
| Palmitic acid (Tm = 62° C.) | 44 wt. % |
| Stearic acid (Tm = 67° C.) | 50 wt. % |

(Example 4)

| | |
|---|---|
| C.I. Direct Black 154 cetylamine salt | 5 wt. % |
| Cetyl alcohol (Tm = 50° C.) | 95 wt. % |

(Example 5)

| | |
|---|---|
| C.I. Direct Black 38 n-stearylamine salt | 3 wt. % |
| Stearone (Tm = 88° C.) | 40 wt. % |
| Lauric acid (Tm = 45° C.) | 57 wt. % |

(Example 6)

| | |
|---|---|
| C.I. Food Black 2 n-stearylamine salt | 7 wt. % |
| Ethylene carbonate (Tm = 39° C.) | 41 wt. % |
| 1,12-Dodecanediol (Tm = 82° C.) | 40 wt. % |

-continued

| | |
|---|---|
| 1,10-Decanediol (Tm = 73° C.) | 12 wt. % |

(Example 7)

| | |
|---|---|
| C.I. Direct Blue 199 cetylamine salt | 6 wt. % |
| Acetamide (Tm = 82° C.) | 30 wt. % |
| Ethylene carbonate (Tm = 39° C.) | 15 wt. % |
| 1,12-Dodecane diol (Tm = 82° C.) | 49 wt. % |

Examples 1 and 6

The recording materials of Examples 1 and 6 were respectively used for recording on three types of commercially available copying papers (Canon NP-DRY, Xerox 4024, and Ricoh PPC paper 6000) by using a recording apparatus as illustrated in FIG. 1 equipped with a recording head as illustrated in FIGS. 2A and 2B.

The recording head had nozzles each measuring 27 μm high and 40 μm-wide and equipped with a heater measuring 32 mm wide and 40 μm long and having an end (closest to the ejection outlet 15) disposed 20 μm distant from the ejection outlet 15. The recording head was energized by applying a voltage of 16.0 V for a pulse width of 2.5 μsec at a drive frequency of 1 kHz. A solid image of 10 cm×10 cm was recorded, and the resultant solid image on each copying paper was superposed with a polyvinyl chloride sheet and left standing for 3 months at 40° C. As a result, no bleeding phenomenon, i.e. no color transfer, was observed on any polyvinyl chloride sheet.

Examples 2–5

The recording materials of Examples 2–5 were respectively used for recording on the same three types of copying papers by using a recording apparatus as illustrated in FIG. 1 equipped with a recording head having nozzles each having a structure as illustrated in FIG. 3. Each nozzle 33 had an inner diameter of 100 μm and a circular tip with a diameter of 60 μm. The piezoelectric vibrator 31 was Supplied with a voltage of 60 volts at a frequency of 2 kHz. A solid image of 10 cm×10 cm was recorded, and the resultant solid image on each copy paper was superposed with a card board (available from Kobayashi Kirokushi K.K.) and left standing for 3 months at 40° C. As a result, no bleeding was observed on any card board.

Example 7

The recording material of Example 7 was used for recording on the same three types of copying papers as in Example 1 by using a recording apparatus as illustrated in FIG. 1 equipped with a recording head as illustrated in FIGS. 4A–4D.

The recording head had nozzles each measuring 10 μm high and 40 μm wide and equipped with a heater measuring 34 μm in both width and length, Each nozzle had a circular ejection outlet right above the heater. The heater was energized with a voltage of 15.0 V for a pulse width of 2.5 μsec at a frequency of 1 kHz. A solid image of 10 cm×10 cm was recorded, and the resultant solid image on each copying paper was superposed with a card board (the same as used in Examples 2–5) and left standing for 3 months at 40° C. As a result, no bleeding was observed on any card board.

Comparative Example 1

A recording material was prepared in the same manner as in Example 1 except that the dye compound (C.I. Food Black 2 dodecylamine salt) was replaced by the same amount of C.I. Solvent Yellow 16.

The thus-obtained recording material was used for recording in the same manner as in Example 1, and the resultant images were subjected to the same standing test for 3 month at 40° C. in contact with a polyvinyl chloride sheet. As a result, conspicuous bleeding was observed on each polyvinyl chloride sheet.

Comparative Example 2

A recording material was prepared in the same manner as in Example 3 except that the dye compound (C.I. Acid Red 35 n-stearylamine salt) was replaced by the same amount of C.I. Solvent Blue 111.

The thus-obtained recording material was used for recording on the three types of copying papers in the same manner as in Example 3, and the resultant images were subjected to the same standing test for 3 months at 40° C. in contact with a card board. As a result, conspicuous bleeding was observed on each card board.

What is claimed is:

1. A normally solid recording material for use in a jet recording method wherein a recording material is ejected through an ejection outlet for recording, said normally solid recording material comprising a heat-fusible solid vehicle and a dye compound which is a salt of a linear alkylamine with a dye.

2. A recording material according to claim 1, wherein said alkylamine has 6–30 carbon atoms.

3. A recording material according to claim 1, wherein said alkylamine has 8–22 carbon atoms.

4. A recording material according to claim 1, wherein said dye compound is contained in a proportion of 0.1–15 wt. %.

5. A recording material according to claim 1, wherein said heat-fusible solid vehicle is contained in a proportion of 50–99 wt. %.

6. A jet recording method, comprising:
placing a normally solid recording material in a heat-melted state in a path defined by a nozzle leading to an ejection outlet, and
imparting to the melted recording material a thermal energy corresponding to a recording signal to generate a bubble, thus ejecting a droplet of the recording material out of the ejection outlet under the action of the bubble;
wherein said normally solid recording material comprises a heat-fusible solid vehicle and a dye compound which is a salt of a linear alkylamine with a dye.

7. A method according to claim 6, wherein the bubble is caused to communicate with ambience.

8. A method according to claim 7, wherein the bubble communicates the ambience when the bubble has an internal pressure not higher than the ambient pressure.

9. A jet recording method, comprising:
placing a normally solid recording material in a heat-melted state in a path defined by a nozzle leading to an ejection outlet, and
actuating a piezoelectric vibrator to cause deformation corresponding to a recording signal, thus ejecting a droplet of the recording material out of the ejection outlet due to the deformation;
wherein said normally solid recording material comprises a heat-fusible solid vehicle and a dye compound which is a salt of a linear alkylamine with a dye.

10. A recording material according to claim 1, wherein said dye has a group of $-SO_3M$ or $-COOM$, wherein M denotes an alkali metal.

11. A jet recording method according to claim 6, wherein said dye has a group of $-S_3M$ or $-COOM$, wherein M denotes an alkali metal.

12. A jet recording method according to claim 9, wherein said dye has a group of $-SO_3M$ or $-COOM$, wherein M denotes an alkali metal.

* * * * *

UNITED STATES PATENT AND TRADEMARK OFFICE
CERTIFICATE OF CORRECTION

PATENT NO. : 5,427,611
DATED : June 27, 1995
INVENTOR(S) : Katsuhiro Shirota, et al It is certified that error appears in the above-indentified patent and that said Letters Patent is hereby corrected as shown below:

Column 1

Line 44, "on" should be deleted.

Column 3

Line 7, "example:" should read --example--.

Column 5

Line 67, "agent,,as" should read --agent, as--.

Column 6

Line 50, "cases" should read --case--.

Column 7

Line 3, "inertante" should read --inertance--; and
    Line 36, "width." should read --width--.

Column 9

Line 7, "shrinkable" should read --shrinkage--.

Column 10

Line 44, "Supplied" should read --supplied--.

UNITED STATES PATENT AND TRADEMARK OFFICE
CERTIFICATE OF CORRECTION

PATENT NO. : 5,427,611
DATED : June 27, 1995
INVENTOR(S) : Katsuhiro Shirota, et al.

It is certified that error appears in the above-indentified patent and that said Letters Patent is hereby corrected as shown below:

Column 12 and
Line 20, "communicates" should read --communicates with--;

Line 38, " $-S_3M$ " should read -- $-SO_3M$ --.

Signed and Sealed this

Fifth Day of December, 1995

Attest:

BRUCE LEHMAN

Attesting Officer

Commissioner of Patents and Trademarks